United States Patent
McReynolds (10) Patent No.: US 8,044,804 B1
(45) Date of Patent: Oct. 25, 2011

(54) LOCALIZING A TAG USING VARIABLE SIGNAL RANGE

(75) Inventor: Alan A. McReynolds, Los Altos, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 775 days.

(21) Appl. No.: 11/756,697

(22) Filed: Jun. 1, 2007

(51) Int. Cl.
*G08B 13/14* (2006.01)

(52) U.S. Cl. ............... 340/572.4; 340/8.1; 340/572.8; 340/572.7; 235/375

(58) Field of Classification Search ........... 340/572.8, 340/568, 568.3, 568.4, 568.1, 568.2, 572.1, 340/572.2, 572.3, 572.4–572.7; 342/118, 342/825.49; 235/375
See application file for complete search history.

(56) References Cited

U.S. PATENT DOCUMENTS

| | | | |
|---|---|---|---|
| 3,864,043 A | 2/1975 | Russell | |
| 4,636,634 A | 1/1987 | Harper et al. | |
| 4,839,875 A | 6/1989 | Kuriyama et al. | |
| 4,903,815 A | 2/1990 | Hirschfeld et al. | |
| 5,038,023 A | 8/1991 | Saliga | |
| 5,216,618 A | 6/1993 | Arita et al. | |
| 5,303,214 A | 4/1994 | Kulakowski et al. | |
| 5,418,732 A | 5/1995 | McFadin | |
| 5,455,409 A | 10/1995 | Smith et al. | |
| 5,579,017 A * | 11/1996 | Smith | 343/722 |
| 5,583,819 A | 12/1996 | Roesner et al. | |
| 5,764,043 A * | 6/1998 | Czosnowski et al. | 324/66 |
| 5,771,003 A | 6/1998 | Seymour | |
| 5,778,309 A * | 7/1998 | Tuttle et al. | 455/127.2 |
| 5,869,820 A | 2/1999 | Chen et al. | |
| 5,963,134 A | 10/1999 | Bowers et al. | |
| 5,991,759 A | 11/1999 | Knoblock et al. | |
| 5,995,019 A * | 11/1999 | Chieu et al. | 340/10.32 |
| 6,002,331 A * | 12/1999 | Laor | 340/539.1 |
| 6,094,173 A * | 7/2000 | Nylander | 343/742 |
| 6,104,311 A * | 8/2000 | Lastinger | 340/10.51 |
| 6,127,928 A | 10/2000 | Issacman et al. | |
| 6,285,293 B1 * | 9/2001 | German et al. | 340/687 |
| 6,317,027 B1 * | 11/2001 | Watkins | 340/10.1 |
| 6,353,406 B1 * | 3/2002 | Lanzl et al. | 342/118 |
| 6,407,933 B1 * | 6/2002 | Bolognia et al. | 361/826 |
| 6,448,886 B2 | 9/2002 | Garber et al. | |
| 6,462,670 B1 | 10/2002 | Bolognia et al. | |
| 6,466,131 B1 * | 10/2002 | Tuttle et al. | 340/572.7 |
| 6,473,762 B1 | 10/2002 | Knoblock et al. | |
| 6,598,789 B1 * | 7/2003 | Matsumoto et al. | 235/383 |
| 6,681,990 B2 | 1/2004 | Vogler et al. | |
| 6,703,935 B1 | 3/2004 | Chung et al. | |
| 6,784,789 B2 * | 8/2004 | Eroglu et al. | 340/10.6 |
| 6,847,856 B1 * | 1/2005 | Bohannon | 700/115 |
| 6,946,950 B1 | 9/2005 | Ueno et al. | |
| 7,084,769 B2 * | 8/2006 | Bauer et al. | 340/572.7 |
| 7,119,693 B1 * | 10/2006 | Devilbiss | 340/572.5 |
| 7,119,738 B2 * | 10/2006 | Bridgelall et al. | 342/129 |
| 7,170,393 B2 * | 1/2007 | Martin | 340/10.1 |
| 7,259,114 B2 * | 8/2007 | Mullinax et al. | 442/58 |
| 7,271,702 B2 * | 9/2007 | Patil et al. | 340/10.42 |
| 7,295,114 B1 * | 11/2007 | Drzaic et al. | 340/572.1 |
| 7,411,921 B2 * | 8/2008 | Strong et al. | 370/328 |

(Continued)

*Primary Examiner* — Benjamin C Lee
*Assistant Examiner* — Quang D Pham (57) ABSTRACT

A method for localizing a tag includes activating an antenna to transmit an RF signal and monitoring for a responsive signal transmitted by the tag. The signal range of the RF signal transmitted by the antenna may be altered if a responsive signal from the tag is not received. The method further includes detecting the responsive signal transmitted by the tag after the tag receives the RF signal transmitted at the altered signal range.

20 Claims, 5 Drawing Sheets

U.S. PATENT DOCUMENTS

| | | | |
|---|---|---|---|
| 7,417,549 B2 * | 8/2008 | Cathey | 340/572.7 |
| 7,468,669 B1 * | 12/2008 | Beck et al. | 340/10.2 |
| 7,518,519 B2 * | 4/2009 | Sullivan et al. | 340/572.1 |
| 7,528,721 B2 * | 5/2009 | Levin et al. | 340/572.1 |
| 7,551,854 B2 * | 6/2009 | Horiuchi et al. | 398/72 |
| 7,605,707 B2 * | 10/2009 | German et al. | 340/572.8 |
| 2003/0052783 A1 * | 3/2003 | Sitzman | 340/572.7 |
| 2003/0151511 A1 * | 8/2003 | Duncan et al. | 340/572.1 |
| 2003/0174099 A1 | 9/2003 | Bauer et al. | |
| 2004/0164864 A1 * | 8/2004 | Chung et al. | 340/572.7 |
| 2004/0212493 A1 * | 10/2004 | Stilp | 340/531 |
| 2004/0212500 A1 * | 10/2004 | Stilp | 340/541 |
| 2005/0140511 A1 * | 6/2005 | Bonnell et al. | 340/572.7 |
| 2005/0215119 A1 * | 9/2005 | Kaneko | 439/607 |
| 2005/0219050 A1 * | 10/2005 | Martin | 340/572.1 |
| 2005/0242958 A1 * | 11/2005 | Lyon et al. | 340/572.7 |
| 2006/0017634 A1 * | 1/2006 | Meissner | 343/742 |
| 2006/0022800 A1 * | 2/2006 | Krishna et al. | 340/10.2 |
| 2006/0049942 A1 * | 3/2006 | Sakama et al. | 340/572.1 |
| 2006/0133609 A1 * | 6/2006 | Rodriguez et al. | 380/201 |
| 2006/0170565 A1 * | 8/2006 | Husak et al. | 340/825.49 |
| 2006/0176152 A1 * | 8/2006 | Wagner et al. | 340/10.2 |
| 2006/0186999 A1 * | 8/2006 | McLaughlin | 340/10.51 |
| 2006/0197652 A1 * | 9/2006 | Hild et al. | 340/10.2 |
| 2006/0214773 A1 * | 9/2006 | Wagner et al. | 340/10.2 |
| 2006/0220874 A1 * | 10/2006 | Campero et al. | 340/572.7 |
| 2006/0261938 A1 * | 11/2006 | Lai et al. | 340/505 |
| 2006/0267730 A1 * | 11/2006 | Steinke et al. | 340/10.1 |
| 2006/0290472 A1 * | 12/2006 | Onderko et al. | 340/10.1 |
| 2007/0040687 A1 * | 2/2007 | Reynolds | 340/572.7 |
| 2007/0205871 A1 * | 9/2007 | Posamentier | 340/10.3 |
| 2007/0250358 A1 * | 10/2007 | Le | 705/7 |
| 2008/0001713 A1 * | 1/2008 | Dasgupta et al. | 340/10.1 |
| 2008/0009257 A1 * | 1/2008 | Safarian et al. | 455/307 |
| 2008/0106416 A1 * | 5/2008 | Sullivan et al. | 340/572.2 |
| 2008/0129461 A1 * | 6/2008 | Abraham | 340/10.1 |
| 2008/0174410 A1 * | 7/2008 | Sarangapani et al. | 340/10.4 |
| 2008/0186167 A1 * | 8/2008 | Ramachandra | 340/539.21 |
| 2008/0224870 A1 * | 9/2008 | Yeo et al. | 340/572.1 |
| 2008/0263133 A1 * | 10/2008 | Le | 709/203 |
| 2008/0266098 A1 * | 10/2008 | Aiouaz et al. | 340/572.1 |
| 2009/0009295 A1 * | 1/2009 | Rofougaran | 340/10.1 |
| 2009/0021343 A1 * | 1/2009 | Sinha | 340/5.2 |
| 2009/0033498 A1 * | 2/2009 | Huomo | 340/572.3 |
| 2009/0098878 A1 * | 4/2009 | Agrawal et al. | 455/445 |
| 2009/0121879 A1 * | 5/2009 | Kim et al. | 340/572.7 |

* cited by examiner

LOCALIZING A TAG USING VARIABLE SIGNAL RANGE

BACKGROUND

Radio frequency identification (RFID) readers are commonly used to determine the presence or absence of an asset having an RFID tag affixed thereto. Typically, an RFID reader powers an antenna, which emits an RF signal and thereby creates an RF field throughout the signal range of the antenna. An RFID tag within this RF field receives the RF signal emitted by the antenna and returns its own signal in response. The signal emitted by the RFID tag is, in turn, received by the antenna to allow the RFID reader to confirm the presence of the RFID tag and, correspondingly, the asset affixed thereto.

However, this system does not provide an indication of the physical position of the RFID tag. In order to localize the asset, or determine its relative position in relation to the RFID reader, multiple antennas have been used to create a plurality of overlapping RF fields. This increases the ability to localize RFID tags, but introduces a number of new problems.

First, the use of multiple antennas often creates misreads, which occur when an RFID tag does not receive a sufficiently strong RF signal to return a responsive signal of its own. This is because, RFID tags, particularly passive RFID tags, which utilize the RF signal transmitted by antennas for power, will not emit a responsive signal unless the RFID tags receive a sufficiently powerful RF signal from the antennas. Thus, even though an RFID tag is located within the RF field created by an antenna. The RFID tag may not respond to the received RF signal, because the received RF signal lacks the power required to elicit a response from the RFID tag. Therefore, the RFID reader registers the RFID tag as not being present, even though the RFID tag is, in fact, within the RF field of the antenna.

Second, the use of multiple antennas often creates cross-reads, which occur when the RF fields of multiple antennas interfere with each other and telegraph the RF signals sent by RFID readers and emitted from RFID tags into adjacent RF fields. Thus, a responding signal sent by an RFID tag may be received by two different antennas, thereby causing a reader to determine that the same RFID tag is located in two different positions. As such, it is often difficult to accurately determine the location of the RFID tag when multiple antennas are used.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are systems and methods for tracking and localizing an RFID tag using variable signal range. Localizing an RFID tag refers to determining the position of the RFID tag relative to a known object or position. For example, the position of the RFID tag in relation to an antenna or a reader device, such as an RFID tag reader, may be determined. The systems may include an array of antennas, where each antenna is configured to transmit an RF signal. For example, two or more antennas may be used to transmit an RF signal to the RFID tag. The RF signal transmitted by the antennas may be received by the RFID tag. In response to receiving the RF signal transmitted by the antennas, the RFID tag may transmit a responsive signal, which may be received by the antennas or a reader device.

The RF signal transmitted by the antennas to the RFID tag may have a variable signal range, which means that the antennas may transmit the RF signal at different strengths, distances and/or directions. For example, an antenna may transmit an RF signal a particular distance from the antenna depending upon the amount of power being supplied into the antenna. This transmission may be monitored to determine if the transmission results in a responsive transmission from an RFID tag. If a responsive transmission by an RFID tag is received, a determination may be made that the RFID tag is located within the particular signal range transmitted by the antenna. Conversely, if a responsive transmission is not received, a determination may be made that no RFID tags are within the particular signal range.

The transmitted signal range of the antennas may be altered until a responsive transmission from an RFID tag is received. For example, if no response transmission is received, a reader device may increase the transmitted signal range of the antenna and, again, monitor for a responsive signal from an RFID tag. In this manner, the distance that the RF signal is transmitted from the antenna, that is, the signal range, may be varied, thus creating a variable signal range. When a responsive signal from an RFID tag is received, the responsive signal may be correlated to the signal range of the RF signal transmitted by the antenna to localize the RFID tag.

The systems and methods used herein may be practiced with an array of multiple antennas. Each antenna may transmit RF signals at variable signal ranges. In this manner, multiple responsive signals from an RFID tag may be received and correlated with the signal ranges that prompted the responsive signals from the RFID tag. Thus, an RFID tag may be localized more accurately when multiple antennas detect a responsive signal from the same RFID tag by correlating the RFID tag with the antenna that transmitted the RF signal at the shortest signal range.

Figure 1:
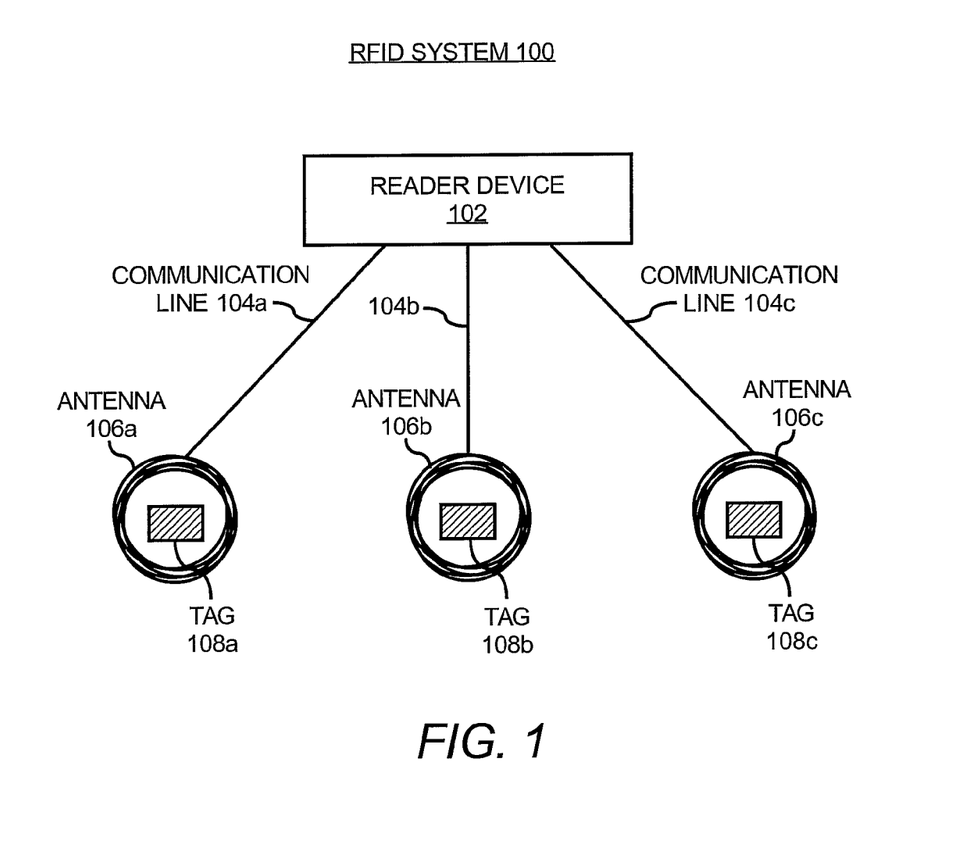
FIG. 1 shows a simplified view of an RFID system for localizing RFID tags using variable RF signal range, according to an embodiment of the invention.

With reference first to FIG. 1, there is shown a simplified view of an RFID system 100, according to an example. Although particular reference has been made herein below to the RFID system 100 as including particular features, it should be understood that the RFID system 100 may include additional components and that some of the components described herein may be removed and/or modified without departing from a scope of the RFID system 100.

The RFID system 100 depicted in FIG. 1, includes a reader device 102 connected to three antennas 106*a*, 106*b*, and 106*c* via communication lines 104a, 104b, and 104c, respectively. As shown, the antennas 106a, 106b, and 106c are in proximity to three tags 108a, 108b, and 108c. The reader device 102 may transmit one or both of power and command signals to one or more of the antennas 106a, 106b, and 106c to cause the antennas 106a, 106b, and 106c to transmit an RF signal from the antennas 106a, 106b, and 106c, which may be received by one or more of the tags 108a, 108b, and 108c.

The tags 108a, 108b, and 108c may comprise, for instance, radio frequency identification (RFID) tags programmed with substantially unique identification (ID) codes that may be used to identify an asset (not shown) associated with one or more of the tags 108a, 108b, and 108c. The tags 108a, 108b, and 108c may also store and transmit additional information, as is known in the art. In one example, the tags 108a, 108b, and 108c may comprise passive devices and may be powered through receipt and conversion of RF signals, such as the RF signals transmitted by the antennas 106a, 106b, and 106c. In another example, the tags 108a, 108b, and 108c may comprise active devices, and may thus draw power from one or more power sources. In yet another example, the tags 108a, 108b, and 108c may comprise a combination of passive and active devices. That is, for instance, one or more of the tags 108a, 108b, and 108c may include power sources that may be deactivated until an activating signal is received and one or more of the tags 108a, 108b, and 108c are passively activated.

As shown in FIG. 1, the antennas 106a, 106b, and 106c generally comprise loop antennas and are positioned to enable the antennas 106a, 106b, and 106c to interrogate one or more of the tags 108a, 108b, and 108c by transmitting RF signals to the tags 108a, 108b, and 108c. The reader device 102 may selectively activate the antennas 106a, 106b, and 106c to interrogate the tags 108a, 108b, and 108c. In this regard, for instance, the reader device 102 may selectively cause the antennas 106a, 106b, and 106c to emit RF signals toward the tags 108a, 108b, and 108c. If the tags 108a, 108b, and 108c comprise passive or semi-passive tags, the tags 108a, 108b, and 108c may convert the RF signals emitted by the antennas 106a, 106b, and 106c to electrical energy, which the tags 108a, 108b, and 108c may use to transmit information, such as, ID information, back to the antennas 106a, 106b, and 106c. If the tags 108a, 108b, and 108c comprise active tags, the tags 108a, 108b, and 108c may use internal power sources (not shown) to transmit information back to the antennas 106a, 106b, and 106c.

In any regard, the information received from the tags 108a, 108b, and 108c may be transmitted or otherwise communicated to other components of the reader device 102 through communication lines 104a, 104b, and 104c. The other components of the reader device 102 are described in greater detail herein below with respect to FIG. 2. Although particular reference is made to a single reader device 102 in FIG. 1, it should be understood that a number of reader devices 102 may be employed to localize the tags 108a, 108b, and 108c. For example, each of the three antennas 106a, 106b, and 106c may be in communication with a separate reader device 102.

Similarly, a person having ordinary skill in the art will appreciate that while FIG. 1 depicts the use of three antennas 106a, 106b, and 106c and three tags 108a, 108b, and 108c, that the RFID system 100 may utilize fewer than three or more than three antennas 106a, 106b, and 106c and/or tags 108a, 108b, and 108c. Moreover, the tags 108a, 108b, and 108c may be located externally to the loop antennas 106a, 106b, and 106c. In addition, the antennas 106a, 106b, and 106c may have other shapes, such as linear, semi-circular, rectangular, etc.

The RFID system 100 may be used in conjunction with, and/or may be substantially similar to the systems and methods described in commonly assigned U.S. patent application Ser. No. 11/389,751, filed on Mar. 27, 2006, entitled "RFID ENABLED CABLE TRACKING", and commonly assigned U.S. patent application Ser. No. 11/389,750, filed on Mar. 27, 2006, entitled "READER DEVICE HAVING CLOSELY PACKED ANTENNAS," and commonly assigned U.S. patent application Ser. No. 11/582,753, filed on Oct. 18, 2006, entitled "TRACKING RFID TAGS WITH OVERLAPPING ANTENNAS," the disclosures of which are hereby incorporated by reference in their entireties. For example, as described in the 11/582,753 application for patent, one or more of the tags 108a, 108b, and 108c may be associated with assets, such as cables connected to cable sockets of a patch panel. Therefore, the systems and methods described herein may be used to identify, track, and localize individual cables in a patch panel. However, the systems and methods described herein may, of course, also be used to identify, track, and/or localize any other asset, which may have a tag associated therewith.

As set forth above, the antennas 106a, 106b, and 106c are operable to transmit RF signals at variable signal ranges. For example, the signal ranges of the antennas 106a, 106b, and 106c may be governed by the amount of power provided to the antennas 106a, 106b, and 106c. For instance, the reader device 102 may provide power to the antennas 106a, 106b, and 106c. In this example, the reader device 102 may be configured to provide the antennas 106a, 106b, and 106c with increased or decreased levels of power. As the reader device 102 drives more power to the antennas 106a, 106b, and 106c, the signal ranges of the antennas 106a, 106b, and 106c increase and, conversely, as less power is delivered to the antennas 106a, 106b, and 106c the signal ranges decrease.

Alternatively, or in addition thereto, the antennas 106a, 106b, and 106c may receive power from another power source or an internal power source (not shown), such as a battery. In this example, the reader device 102 may send control signals to the antennas 106a, 106b, and 106c or to a controller (not shown) associated with the power source for the antennas 106a, 106b, and 106c to alter the amount of power provided to the antennas 106a, 106b, and 106c, and thus the signal ranges of the antennas 106a, 106b, and 106c.

In either case, the power delivered to the antennas 106a, 106b, and 106c may be varied to effectuate the variable signal ranges. For example, the antennas 106a, 106b, and 106c may be provided with a minimal amount of power to transmit an RF signal having a relatively short signal range. The power delivered to the antennas 106a, 106b, and 106c may be increased to iteratively increase the signal ranges of the antennas 106a, 106b, and 106c. At each power level, the reader device 102 may monitor for a responsive RF signal from the tags 108a, 108b, and 108c. If a responsive signal is received from the tags 108a, 108b, and 108c, the power level provided to the antennas when the responsive signal was received may be used to localize the tags 108a, 108b, or 108c, as described in greater detail below.

Alternatively, however, the antennas 106a, 106b, and 106c may be provided with a maximum amount of power to transmit an RF signal having a maximum signal range. The power delivered to the antennas 106a, 106b, and 106c may be decreased to iteratively decrease the signal ranges of the antennas 106a, 106b, and 106c. At each power level, the reader device 102 may monitor for a responsive RF signal from the tags 108a, 108b, and 108c. If a responsive signal is received from the tags 108a, 108b, and 108c, the power level provided to the antennas when the responsive signal was received may be used to localize the tags 108a, 108b, or 108c, A person having ordinary skill in the art will appreciate that the signal ranges of the antennas 106a, 106b, and 106c may also be varied in other systematic or random patterns. Moreover, the signal ranges of the antennas 106a, 106b, and 106c may be varied gradually or sequentially. That is, the signal range may be varied in a smooth analog continuum or digitally in incremental steps.

The signal ranges of the antennas 106a, 106b, and 106c may be varied by methods other than by providing different levels of power to the antennas 106a, 106b, and 106c. For example, the antennas 106a, 106b, and 106c may be increased or decreased in size to vary their signal ranges. For example, a single antenna, such as the antenna 106a may be made physically larger or smaller or two different antennas, such as the antennas 106a and 106b may be combined, either physically or electronically. That is, the antennas 106a and 106b may be brought into physical contact with each other or they may be connected electrically via a wire, or other means, to combine the transmitting capabilities of the two antennas 106a and 106b. In another example, one or more of the antennas 106a, 106b, and 106c may be tuned or repositioned to provide a stronger or weaker transmission signal in a particular direction. In a further example, the modulation of the RF signal transmitted by one or more of the antennas 106a, 106b, and 106c may be altered to allow the RF signal transmission to communicate optimally with a particular tag. For instance, each of the three tags 108a, 108b, and 108c may be configured to respond to a differently modulated RF signal. Therefore, the antennas 106a, 106b, and 106c may transmit differently modulated RF signals to elicit a response from a particular one of the tags 108a, 108b, and 108c.

The antennas 106a, 106b, and 106c, may be "closely packed," which for purposes of this disclosure, generally indicates that at least one of the antennas 106a, 106b, and 106c may be within an RF signal range of another of the antennas 106a, 106b, and 106c. As such, the terms "closely packed" may also generally indicate that at least one of the antennas 106a, 106b, and 106c may become coupled or tuned to a second antenna 106a, 106b, and 106c when the second antenna 106a, 106b, and 106c is activated. In addition, "closely packed" may indicate that some of the antennas 106a, 106b, and 106c are overlapping. The use of closely packed antennas is substantially described in the 11/582,753 application for patent, which has been incorporated by reference in its entirety above.

Figure 2:
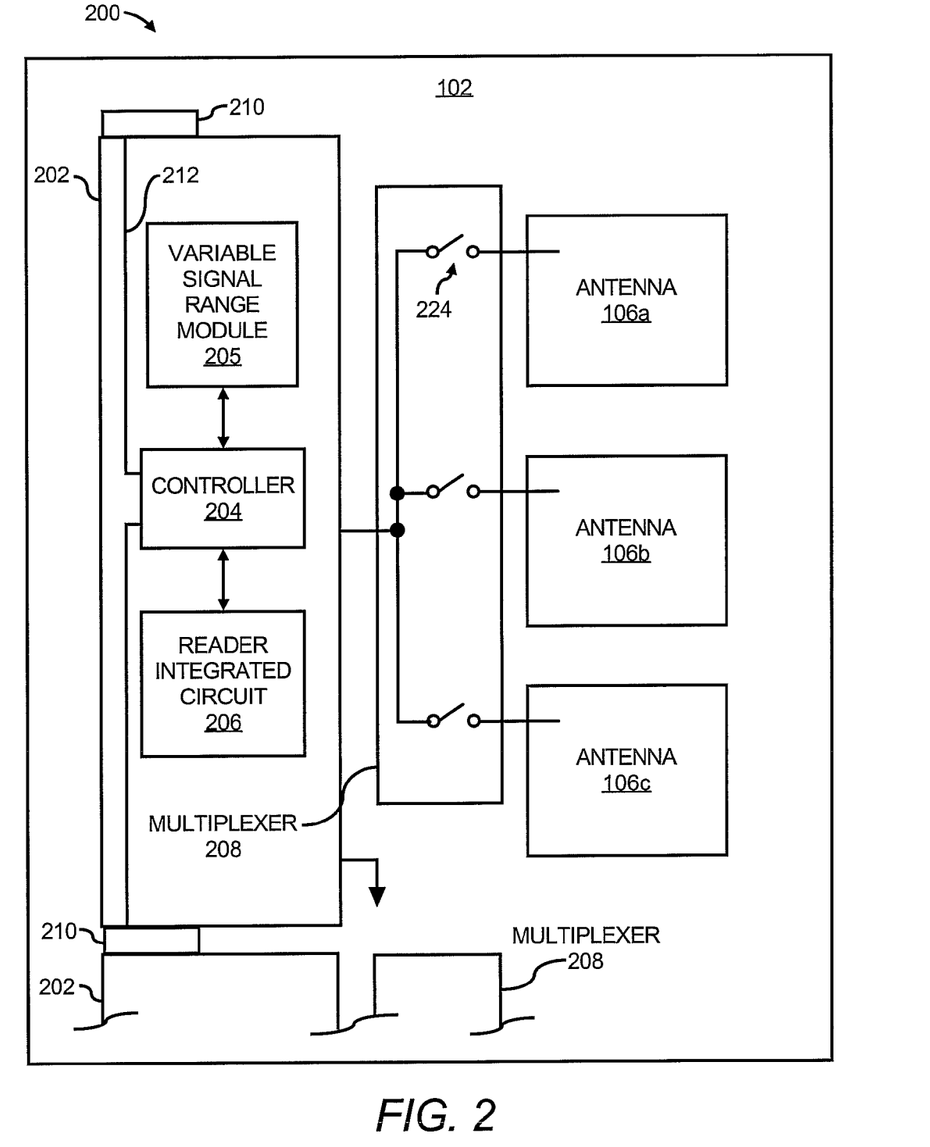
FIG. 2 shows a simplified schematic diagram of a tag localizing system using variable RF signal range, according to an embodiment of the invention.

With particular reference now to FIG. 2, there is shown a simplified schematic diagram of a tag localizing system 200 having a reader device 102, according to an example. Although particular reference has been made herein below to the tag localizing system 200 as including particular features, it should be understood that the tag localizing system 200 may include additional components and that some of the components described may be removed and/or modified without departing from a scope of the tag localizing system 200.

The tag localizing system 200 is illustrated as including a reader device 102, which is described in greater detail herein below. The tag localizing system 200 may also include a number of tags 108a, 108b, and 108c (shown in FIG. 1), which may be associated with a number of assets to be localized and tracked. For instance, the tagged assets may include cables operable to connect to a patch panel, as mentioned above.

The reader device 102 is depicted as including a plurality of reader boards 202 to which the antennas 106a, 106b, and 106c are connected for purposes of illustration and not of limitation. Thus, for instance, it should be understood that the reader device 102 may include a single reader board 202 without departing from a scope of the reader device 102. Although the antennas 106a, 106b, and 106c have been depicted as forming part of the reader device 102, it should be understood that the antennas 106a, 106b, and 106c may comprise separate components, for instance, as shown in FIG. 1, without departing from a scope of the tag localizing system 200.

The reader boards 202 may each be configured to activate a plurality of closely packed antennas 106a, 106b, and 106c. Moreover, the plurality of reader boards 202 may be configured to enable data to be transferred between the reader boards 202, such as, in a daisy-chain configuration.

The positions of each of the antennas 106a, 106b, and 106c may be associated with their respective locations and entered into a memory (not shown), such as in a non-volatile memory or a separate storage device (not shown). In this regard, the antennas 106a, 106b, and 106c may be employed to localize the tags 108a, 108b, and 108c through interrogation of the tags 108a, 108b, and 108c.

The reader board 202 includes a controller 204 for controlling the antennas 106a, 106b, and 106c and for processing information received from the tags 108a, 108b, and 108c through the antennas 106a, 106b, and 106c. The reader board 202 also includes a reader integrated circuit 206, a signal multiplexer 208, and a variable signal range module 205. The reader integrated circuit 206 is generally configured to convert digital signals from the controller 204 into a modulated energizing signal to be sent through the signal multiplexer 208 and to the antennas 106a, 106b, and 106c. The reader integrated circuit 206 may also demodulate amplitude variations that may be introduced into the digital signals when a tag 108a, 108b, or 108c is placed in the signal range of one or more of the antennas 106a, 106b, and 106c. The reader integrated circuit 206 may further select the appropriate signal processing parameters based upon a chosen protocol. For instance, the reader integrated circuit 206 may output a demodulated tag signal from which the controller 204 may decode to derive the ID and memory contents of an interrogated tag 108a, 108b, or 108c.

The controller 204 may be programmed to sequentially activate the antennas 106a, 106b, and 106c from left-right, vice-versa, or in any desired pattern since the location of each antenna 106a, 106b, and 106c is recorded. It is also contemplated that multiple antennas 106a, 106b, and 106c may be simultaneously activated, for instance, in configurations where the reader device 102 includes multiple reader boards 202, and thus multiple controllers 204 and multiplexers 208.

In any event, the controller 204 may query the status of any given tag 108a, 108b, or 108c by activating the antennas 106a, 106b, and 106c to detect the presence or absence of the tags 108a, 108b, and 108c and thus their corresponding assets. The locations of the antennas 106a, 106b, and 106c may be stored in a memory (not shown). Thus, the controller 204 may correlate the predesignated or known location of each of the antennas 106a, 106b, and 106c to a corresponding detected tag 108a, 108b, or 108c and associated asset. Accordingly, the controller 204 may detect not only the presence of any given asset, but may also determine the location of a particular asset by the ID code of the tag 108a, 108b, and 108c associated with the asset.

The controller 204 may invoke the variable signal range module 205 when activating one or more of the antennas 106a, 106b, and 106c. The variable signal range module 205 may comprise software, firmware, or the like, which the controller 204 may utilize to implement the transmission of an RF signal having a variable signal range from one or more of the antennas 106a, 106b, and 106c. The controller 204 may invoke the variable signal range module 205 to determine the range of the RF signal, the direction of the RF signal, the modulation of the RF signal, etc., emitted from one or more of the antennas 106a, 106b, and 106c. For example, by invoking the signal range module 205, the controller 204 may determine that a minimum amount of power should be delivered to one or more of the antennas 106a, 106b, and 106c, thereby resulting in an RF signal transmission from one or more of the antennas 106a, 106b, and 106c having a minimal signal range. If the controller 204 does not detect a responsive signal, the controller 204 may utilize the variable signal range module 205 to determine that the power delivered to one or more of the antennas 106a, 106b, and 106c should be increased by a certain level, thereby increasing the signal range of the RF transmission. The controller 204 may, again, monitor for a responsive signal. This process may be repeated until the controller 204 detects a responsive signal or determines that the process should otherwise be stopped.

In another example, the controller 204 may invoke the variable signal range module 205 to alter the signal ranges of one or more of the antennas 106a, 106b, and 106c by other methods. For example, the controller 204 may electrically couple two or more of the antennas 106a, 106b, and 106c to increase the signal ranges of the antennas. In other examples, the controller 204 may reposition or change the directions of the RF transmissions from one or more of the antennas 106a, 106b, and 106c.

A person having ordinary skill in the art will appreciate that the signal ranges of the antennas 106a, 106b, and 106c may also be decreased or altered according to any systematic or random pattern. For example, based on a previous RF signal transmission, the controller 204 may determine that a specific signal range of one or more of the antennas 106a, 106b, and 106c results in an accurate responsive signal from one or more of the tags 108a, 108b, and 108c. Therefore, the controller 204 may provide a predetermined amount of power, for instance, to the one or more of the antennas 106a, 106b, and 106c to transmit an RF signal have the specific signal range. If no responsive signal is detected, the controller 204 may invoke the variable signal range module 205 to determine that an RF signal having a slightly increased or decreased signal range, in relation to the specific signal range initially transmitted, should be transmitted.

As described above, with respect to FIG. 1, the reader device 102 may comprise at least one radio frequency (RF) reader device and the tags 108a, 108b, and 108c may comprise radio frequency identification (RFID) devices. In this example, the reader device 102 may transmit an RF signal through respective ones of the antennas 106a, 106b, and 106c to thereby interrogate respective ones of the tags 108a, 108b, and 108c, for instance, in a sequential manner. In response, the tags 108a, 108b, and 108c may transmit information back to the reader device 102 through respective ones of the antennas 106a, 106b, and 106c. The controller 204 may process the information received from the tags 108a, 108b, and 108c and/or may transmit the information to another controller or computer system.

The controller 204 and the reader integrated circuit 206 are depicted as being configured to communicate with each other and the signal multiplexer 208. In addition, the reader board 202 is depicted as including connectors 210 to which the controller 204 is connected through a serial port 212. By way of example, the connectors 210 may enable data collected from the controller 204 to be communicated to another device, such as another reader board 202, another controller (not shown), etc. In addition, or alternatively, the connectors 210 may enable adjacent reader boards 202 to be physically connected to each other and may comprise any reasonably suitable type of connector, such as, a male/female-type connector. As such, for instance, a plurality of reader boards 202 may be employed to obtain information from a plurality of tags 108a, 108b, or 108c.

The controller 204 may select an antenna 106a, 106b, or 106c to activate through operation of the signal multiplexer 208. The controller 204 may also close the switch 224 of a selected antenna 106a, 106b, or 106c to thereby cause the selected antenna 106a, 106b, or 106c to emit an RF signal directed toward one or more of the tags 108a, 108b, and 108c. If, for instance, a tag 108a is present on an asset, the tag 108a may return a signal back to the controller 204 through the activated antenna 106a. If, on the other hand, a tag 108a is not within the signal range of the antenna 106a, the controller 204 will not receive a responsive signal. According to one example, the controller 204 may increase the power provided to the antenna 106a to thereby increase the signal range of the antenna 106a and monitor for a responsive signal from the tag 108a. The controller 204 may continue to increase the power provided to the antenna 106a until a responsive signal is received, until the maximum signal range or a predetermined signal range of the antenna 106a is reached, etc.

When a responsive signal is received, the controller 204 may correlate the data encoded in the responsive signal, such as the unique ID information of one or more of the tags 108a, 108b, and 108c with the known location of the antenna 106a, 106b, or 106c which received the responsive signal and, further, with the signal range of the RF signal transmission which resulted in the responsive signal.

An actual distance measurement of the signal range may be substantially equivalent to a factor, which resulted in the signal range of the RF signal transmission that produced the responsive signal. For example, the amount of power driven to the antenna 106a, 106b, or 106c, which received the responsive signal may be utilized by the controller 204 in lieu of, or in addition to, an actual distance measurement of the signal range. Therefore, the signal range of the antenna 106a, 106b, or 106c may be defined by the amount of power provided to the antenna 106a, 106b, or 106c, because the amount of power provided to the antenna 106a, 106b, or 106c may be directly proportional to the signal range of the antenna 106a, 106b, or 106c. As described above, the signal range may also be defined by other factors, such as size and position. In this manner the controller 204 may identify the antenna 106a, 106b, or 106c that elicited the response from the tag 108a, 108b, or 108c using the shortest signal range or which required the least amount of power to elicit the responsive signal from the tag 108a, 108b, or 108c. This correlated information may then be stored in a memory (not shown) and/or transmitted to another device.

The tag localizing system 200 may include components not illustrated in FIG. 2, but, which are described in the commonly assigned and copending U.S. patent applications incorporated by reference herein above. For example, the antennas 106a, 106b, and 106c may be modified to prevent cross-coupling among the antennas 106a, 106b, and 106c from occurring. In this respect, the antennas 106a, 106b, and 106c may include RLC circuits, in which, a resistor 318 and a capacitor 320 are placed in series with an inductor 322. In addition, the antennas 106a, 106b, and 106c may be connected to respective switches 224 of the signal multiplexer 208.

The switches 224, when closed, allow the selected antennas 106a, 106b, and 106c to emit RF signals to interrogate and detect one or more tags 108a, 108b, and 108c. When the switches 224 of selected antennas 106a, 106b, and 106c are opened, the selected antennas 106a, 106b, and 106c are isolated from the reader 102 and the selected antennas 106a, 106b, and 106c do not form a current loop, and thus substantially prevents cross-coupling with the other antennas 106a, 106b, and 106c in the antenna array.

Figure 3:
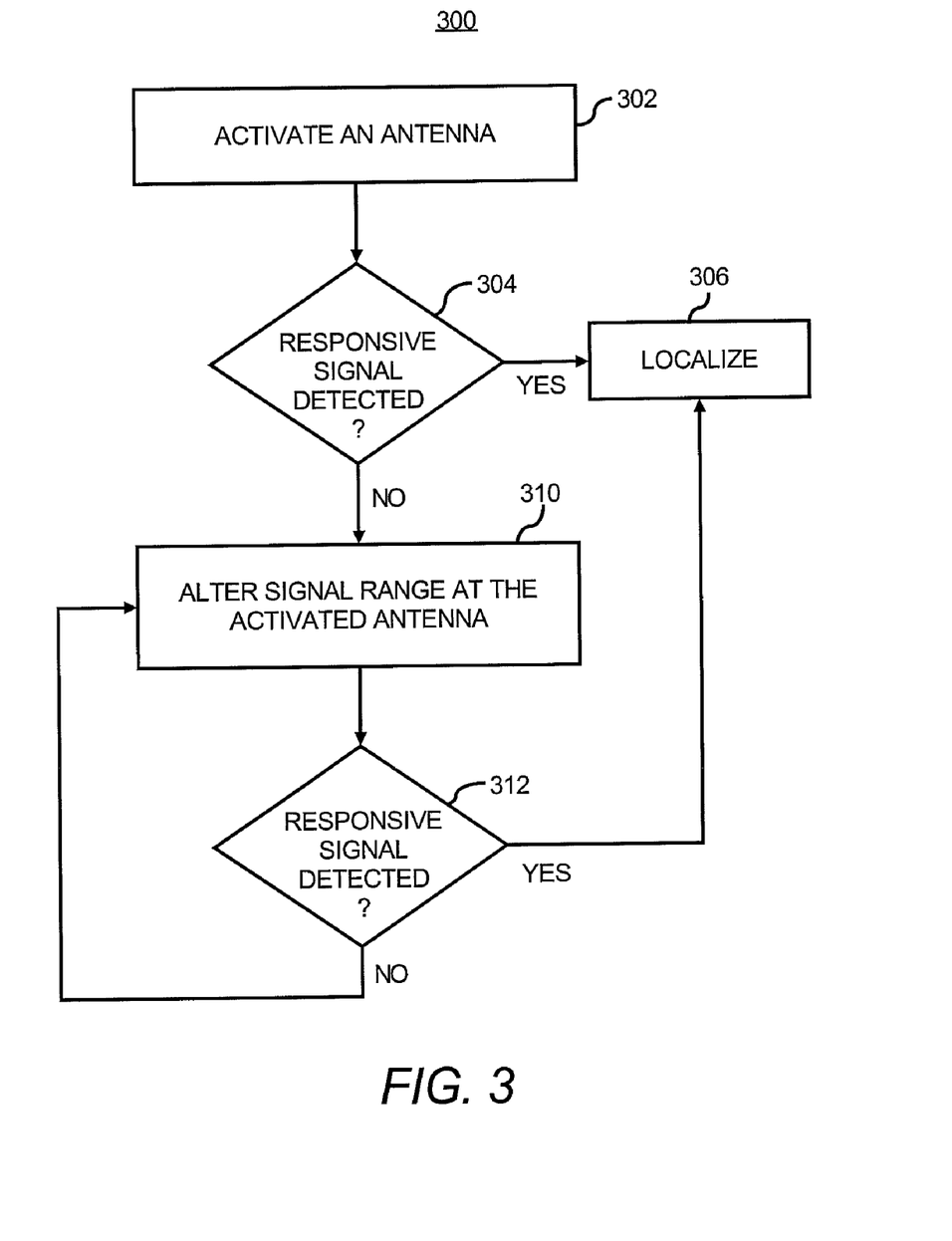
FIG. 3 shows a flow diagram of a method for localizing an RFID tag using variable RF signal range, according to an embodiment of the invention.

Turning now to FIG. 3, there is shown a flow diagram of a method 300 for localizing a tag, according to an example. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

The description of the method 300 is made with reference to the elements depicted in FIGS. 1 and 2, and thus makes reference to the elements cited therein. It should, however, be understood that the method 300 is not limited to the elements set forth in FIGS. 1 and 2. Instead, it should be understood that the method 300 may be practiced by a system having a different configuration than that set forth in FIGS. 1 and 2.

Generally speaking, the method 300 may be implemented to track and/or localize one or more of the tags 108a, 108b, and 108c depicted in FIG. 1, which may be RFID tags associated with assets, such as cables configured to be connected to a patch panel. The presence or absence of the tags 108a, 108b, and 108c may be detected through interrogation of the tags 108a, 108b, and 108c with an RF signal. The locations of the tags 108a, 108b, and 108c may be stored to thereby maintain an inventory of the assets associated with the tags 108a, 108b, and 108c. In addition, the method 300 may be repeated as needed or desired to update the inventory as the assets may be removed, moved, or replaced.

At step 302, an antenna, such as one of the antennas 106a, 106b, or 106c, may be activated. The antenna 106a, 106b, or 106c may be activated by the controller 204. For instance, the controller 204 may be programmed to activate the antenna 106a, 106b, or 106c according to a programmed routine, such as, at various times, for a set duration of time, substantially continuously, etc. In addition, or alternatively, the controller 204 may be programmed to activate the antenna 106a, 106b, or 106c, for instance, when an asset is detected, removed, activated, deactivated, etc.

In one example, the controller 204 may activate selected ones of the antennas 106a, 106b, and 106c in a sequential manner. In another example, the controller 204 may activate selected ones of the antennas 106a, 106b, and 106c in a non-sequential order or substantially simultaneously. In any regard, the controller 204 may activate the selected antenna(s) 106a, 106b, and 106c through operation of the signal multiplexer 208. More particularly, for instance, with respect to FIG. 2, the signal multiplexer 208 may close the switches 224 of the selected antenna(s) 106a, 106b, and 106c to thereby cause an RLC circuit of the selected antenna(s) 106a, 106b, and 106c to provide power to the antenna to generate an RF signal.

Following step 302, a determination may be made, at step 304, as to whether or not a responsive signal was detected. For example, the controller 204 may determine that a responsive signal was received from one or more tags 108a, 108b, and 108c, for instance, in the form of a return transmission from the tag(s) 108a, 108b, and 108c. If a responsive signal was detected, the method 300 continues to step 306 where the responsive signal may be localized by correlating the tag with the signal range of the transmitted RF signal and the location of the antenna which transmitted the RF signal, as will be discussed in greater detail below.

If, however, a response was not detected, the method 300 may continue to step 310. At step 310, the signal range of the RF signal transmitted by the activated antenna is altered. The signal range may be increased or decreased by a number of different methods, as described above. For instance, the power provided to the activated antenna may be proportional to the signal range of the antenna. Therefore, more or less power may be provided to the activated antenna to increase or decrease the signal range of the activated antenna. In other examples, the size of the activated antenna may be increased or decreased or the activated antenna may be tuned or repositioned to increase or decrease the signal range.

Following step 310, a determination may be made, at step 312, as to whether or not a responsive signal was detected. For example, the controller 204 may determine whether a responsive signal was received from one or more of the tags 108a, 108b, and 108c, for instance, in the form of a return transmission from the tag(s) 108a, 108b, and 108c. If a responsive signal was not detected, the method 300 may continue back to step 310.

At step 310, the controller 204, for instance, may again alter the signal range of the activated antenna. In one example, the initial RF signal transmitted by the activated antenna may have a minimal signal range. This minimal signal range, however, may be inadequate to elicit a responsive signal from a tag. Therefore, following step 312, the controller 302 may increase the signal range of the activated antenna in an iterative process and monitor the transmission at each transmitted signal range to determine if a responsive transmission from one or more of the tags 108a, 108b, and 108c has been detected. In other examples, the size of the signal range may be decreased, or varied in systematic or random patterns, as described above. This cycle may be repeated until a responsive signal from one or more of the tags 108a, 108b, and 108c is detected.

When a responsive signal is detected, the method 300 may continue to step 306. At step 306, the responsive signal may be localized by correlating the responsive signal to other data. For example, the responsive signal may include data encoded in an RF transmission. The data may include ID information for an RFID tag, information related to an asset, etc. This data may be correlated to the location of the activated antenna, which transmitted the RF signal that elicited the response from the one or more of the tags 108a, 108b, and 108c.

The responsive signal may be further localized by correlating the responsive signal with the signal range of the RF transmission which elicited the response from the tag 108a, 108b, or 108c. For example, the ID information of the tag 108a, 108b, or 108c may be correlated to the signal range to provide a determination as to the proximity of the tag 108a, 108b, or 108c from the antenna 106a, 106b, or 106c. This correlation may compensate for the occurrence of misreads. That is, multiple antennas 106a, 106b, or 106c may each transmit an RF signal, which elicits a response from a single RFID tag, for example, tag 108a. In order to localize the RFID tag and determine which of the multiple antennas 106a, 106b, or 106c the RFID tag 108a is located closest to, the signal range of each RF transmission that resulted in the responsive signal from the RFID tag 108a may be correlated to the data from the RFID tag 108a. Thus, a determination may be made that the RFID tag 108a is closest to the antenna which transmitted at the smallest signal range. This process is described in greater detail below, with respect to FIG. 4.

Figure 4:
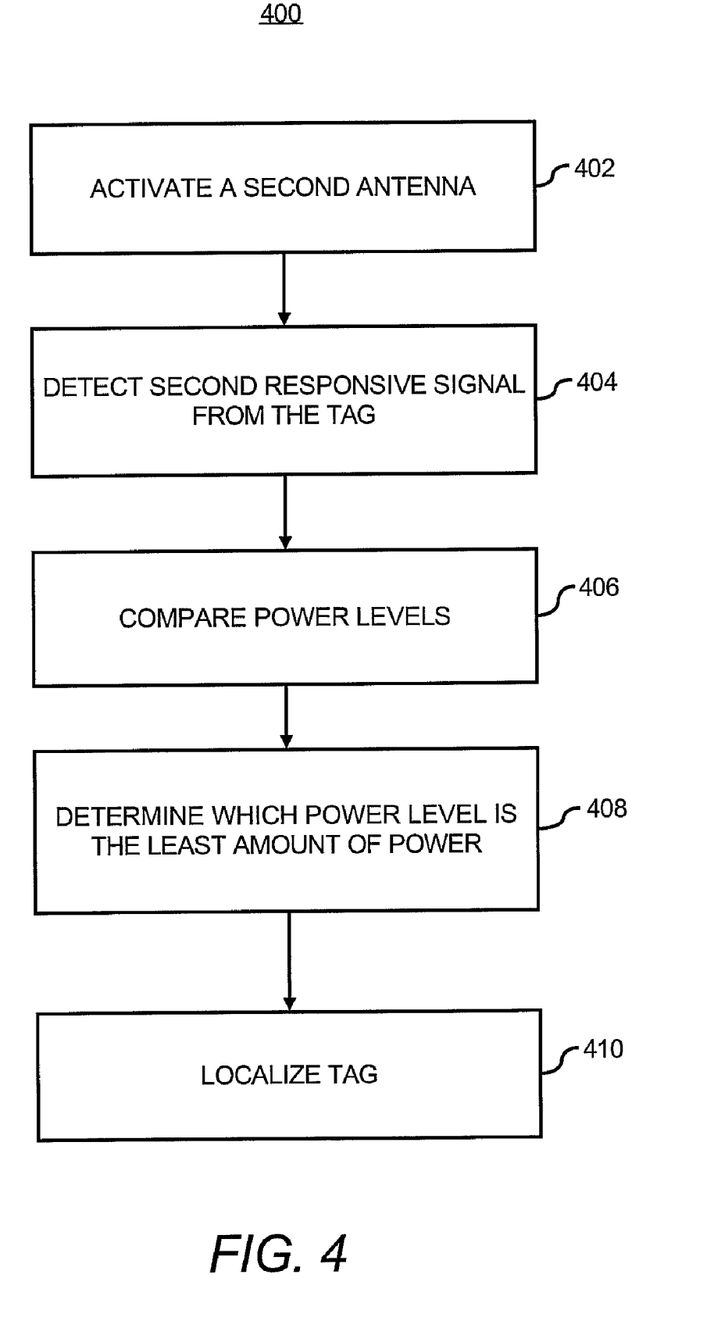
FIG. 4 shows a flow diagram of a method for localizing an RFID tag using variable RF signal range and a second antenna, according to an embodiment of the invention.

Turning now to FIG. 4, there is shown a flow diagram of a method 400 for localizing a tag 108a, 108b, or 108c using a second antenna 106a, 106b, or 106c, according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to the elements depicted in FIGS. 1, 2 and 3, and thus makes reference to the elements cited therein. It should, however, be understood that the method 400 is not limited to the elements set forth in FIGS. 1, 2, and 3. Instead, it should be understood that the method 300 may be practiced by a system having a different configuration than that set forth in FIGS. 1, 2 and 3.

Generally speaking, the method 400 may be implemented to track and/or localize one or more of the tags 108a, 108b, and 108c, depicted in FIG. 1, which may be RFID tags associated with assets, such as cables configured to be connected to a patch panel. The method 400 may be performed substantially simultaneously with the method 300, described with respect to FIG. 3, or following implementation of the method 300.

At step 402, a second antenna, such as one of the antennas 106a, 106b, or 106c, may be activated. The antenna 106a, 106b, or 106c may be activated by the controller 204 and may be manually or automatically initiated. In the latter case, the controller 204 may be programmed to activate the antenna 106a, 106b, or 106c according to a programmed routine, such as, at various times, for a set duration of time, substantially continuously, etc. In addition, or alternatively, the controller 204 may be programmed to activate the antenna 106a, 106b, or 106c, for instance, when an asset is detected, removed, activated, deactivated, etc.

The second antenna may be activated simultaneously with the activation of the antenna described in step 302 of FIG. 3. Alternatively, the second antenna may be activated after the activation of the antenna described in step 302 of FIG. 3. The second antenna may be activated in a manner similar to the antenna described in FIG. 3. For example, the second antenna may be activated by the controller 204 providing power to the second antenna, thereby causing the second antenna to transmit an RF signal.

At step 404, a second responsive signal from the tag, for example, the tag 108a, is detected. The second responsive signal described here is a transmission from the same tag 108a, which emitted the responsive signal described in step 312 of FIG. 3. Therefore, the antenna described in FIG. 3 and the second antenna described here both transmit an RF signal, which elicits a response from the same tag 108a. Multiple antennas generally elicit responses from the same tag 108a, because a cross-read has occurred. As such, in order to localize the tag 108a, a determination must be made as to which antenna the tag 108a is in the closest physical proximity.

Thus, at step 406, power levels are compared. The power levels may be the power level provided to the antenna described with respect to FIG. 3 and the power level provided to the second antenna when the respective antennas transmitted the RF signal, which elicited the responses from the tag 108a. The power levels may be compared to provide an indication of signal range, because the power provided to the antennas may be proportional to the signal ranges of the antennas. Although power levels are described here, with respect to FIG. 4, a person having ordinary skill in the art will appreciate that any indication of signal range may be compared.

At step 408, a determination may be made as to which power level is lower. For example, at step 408, the controller 204 may determine that the second antenna received the least amount of power while transmitting the RF signal, which elicited the response from the tag 108a. This determination results in a conclusion that the tag 108a is located closer to the second antenna than to the antenna described in FIG. 3, because the second antenna elicited a response from the tag 108a while transmitting at the shortest signal range. As such, the tag may be localized at step 410 based upon the determined power levels. It should be understood that the method 400 may be performed for any number of antennas in localizing tags. As such, for instance, the same tag 108a may be interrogated by more than two antennas and the power levels of the antennas at which responsive signals are received from the tag 108a may be compared with each other to localize the tag 108 with respect to the antenna positions, for instance, through triangulation.

Some or all of the operations set forth in the methods 300 and 400 may be contained as a utility, program, or subprogram, in any desired computer accessible medium. In addition, the methods 300 and 400 may be embodied by a computer program, which may exist in a variety of forms both active and inactive. For example, it can exist as software program(s) comprised of program instructions in source code, object code, executable code or other formats. Any of the above can be embodied on a computer readable storage medium, which include storage devices.

Exemplary computer readable storage mediums include conventional computer system RAM, ROM, EPROM, EEPROM, and magnetic or optical disks or tapes. It is therefore to be understood that any electronic device capable of executing the above-described functions may perform those functions enumerated above.

Figure 5:
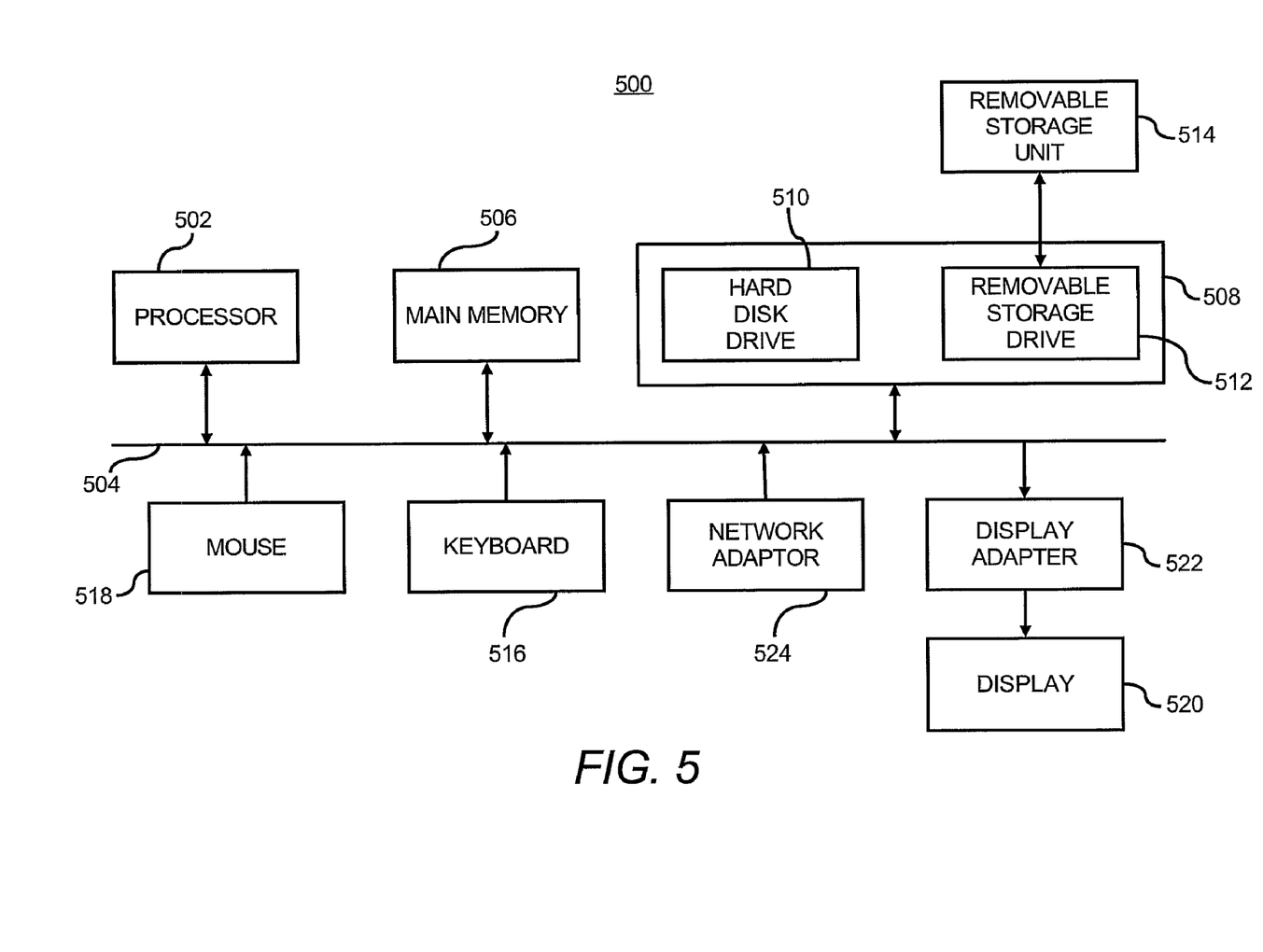
FIG. 5 illustrates a computer system, which may be employed to perform various functions described herein, according to an embodiment of the invention.

FIG. 5 illustrates a computer system 500, which may be employed to perform the various functions of the controller 204 described herein above, according to an example. In this respect, the computer system 500 may be used as a platform for executing one or more of the functions described hereinabove with respect to the controller 204.

The computer system 500 includes a processor 502 that may be used to execute some or all of the steps described in the methods 300, 400. Commands and data from the processor 502 are communicated over a communication bus 504. The computer system 500 also includes a main memory 506, such as a random access memory (RAM), where the program code for, for instance, the controller 204, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for localizing and/or tracking tags may be stored. In addition, information pertaining to at least one of the locations of the tags 108a, 108b, or 108c and the identities of associated assets may also be stored in at least one of the main memory 506 and the secondary memory 508.

The removable storage drive 510 may read from and/or write to a removable storage unit 514 in a well-known manner. User input and output devices may include, for instance, a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of localizing a plurality of cables with a reader device having a plurality of loop antennas, said method comprising:
    placing a plurality of radio frequency identification (RFID) tags near ends of the plurality of cables;
    placing the plurality of loop antennas over a plurality of respective cable sockets configured to receive the ends of the plurality of cables, wherein each of the plurality of loop antennas comprises an opening and is positioned to receive a cable end through the opening;
    activating at least one of the plurality of antennas to transmit an RF signal at a first signal range;
    determining whether a responsive signal is received from at least one of the RFID tags;
    altering the signal range of the at least one of the plurality of antennas to a second signal range in response to a determination that a responsive signal has not been received from at least one of the RFID tags;
    determining whether a responsive signal is received from at least one of the RFID tags; and
    in response to a determination that a responsive signal has been received from at least one of the RFID tags, localizing the position of the at least one of RFID tag and at least one cable on which the at least one tag has been positioned based upon the signal range at which the responsive signal from the tag was received.

2. The method of claim 1, wherein activating the at least one of the plurality of antennas to transmit the RF signal includes providing power to the at least one of the plurality of antennas at a first level and, wherein altering the signal range of the RF signal transmitted by the at least one of the plurality of antennas comprises:
    providing power to the at least one of the plurality of antennas at a second level, which is different from the first level.

3. The method of claim 1, wherein localizing the tag and the cable further comprises:
    identifying the signal range at which the responsive signal was received from the tag; and
    correlating the identified signal range with the position of the tag.

4. The method of claim 3, wherein localizing the tag and the cable further comprises:
    correlating data encoded in the responsive signal with a power level provided to the at least one of the plurality of antennas, wherein the power level provided to the at least one of the plurality of antennas is the power level which generated the second signal range.

5. The method of claim 1, further comprising:
    activating a second antenna to transmit a second RF signal, wherein the RF signal and the second RF signal overlap.

6. The method of claim 5, further comprising:
    detecting a second responsive signal transmitted by the tag, wherein the second responsive signal is transmitted by the tag in response to the tag receiving the second RF signal.

7. The method of claim 6, further comprising:
    comparing a first power level at which the antenna received the responsive signal from the tag with a second power level at which the second antenna received the second responsive signal from the tag.

8. The method of claim 7, further comprising:
    determining which of the first power level and the second power level is the lowest; and
    determining that the tag is closer to one of the antenna and the second antenna based upon which of the first power level and the second power level is the lowest.

9. The method of claim 1, wherein altering the signal range of the antenna to the second signal range comprises:
    one of increasing and decreasing the size of the antenna.

10. The method of claim 1, wherein altering the signal range of the antenna to the second signal range comprises:
    repositioning the antenna to provide one of a stronger and a weaker RF signal in a particular direction.

11. A system for localizing a plurality of cables, said system comprising:
    a plurality of cable sockets;
    a plurality of radio frequency identification (RFID) tags placed near ends of the plurality of cables, wherein the ends of the plurality of cables are configured to be inserted into respective ones of the plurality of cable sockets;
    a reader device having a plurality of loop antennas, each of said plurality of loop antennas being positioned over at least one of the plurality of cable sockets and comprising an opening and being positioned to receive a cable end through the opening, and wherein the reader device is operable to selectively activate at least one antenna of the plurality of antennas to transmit a radio frequency (RF) signal from the at least one antenna, wherein the reader device is further operable to,
    selectively alter a signal range of the transmitted RF signal to a plurality of different signal ranges,
    determine whether a responsive signal from a tag has been received at each of the plurality of different signal ranges,
    receive a responsive signal transmitted by the tag, wherein the tag transmits the responsive signal in response to receiving the RF signal transmitted by the at least one antenna at one of the plurality of different signal ranges, and
    localize the tag and a cable on which the tag has been placed by correlating the received responsive signal with the one of the plurality of different signal ranges that resulted in eliciting the responsive signal.

12. The system of claim 11, wherein the reader device is operable to selectively alter the signal range of the transmitted RF signal by selectively varying an amount of power provided to the at least one antenna.

13. The system of claim 12, wherein the one of the plurality of different signal ranges that resulted in the receipt of the responsive signal is proportional to the amount of power provided to the at least one antenna which transmitted the one of the plurality of different signal ranges.

14. The system of claim 11, wherein the plurality of antennas are arranged in an array.

15. The system of claim 14, wherein the plurality of antennas are configured to be selectively activated to transmit overlapping RF signals.

16. The system of claim 11, wherein the reader device is further configured to localize the tag based upon the signal range at which the responsive signal was received from the tag.

17. The system of claim 11, wherein the plurality of RFID tags are positioned substantially near the centers of the loop antennas.

18. The system of claim 11, wherein the reader device is further operable to,
   activate a second antenna from the plurality of antennas to transmit a second RF signal from the second antenna,
   receive a second responsive signal transmitted by at least one of the plurality of tags, wherein the plurality of tags are configured to transmit the second responsive signal in response to receiving the second RF signal transmitted by the second antenna,
   compare a first power level at which the antenna received the responsive signal from the tag with a second power level at which the second antenna received the second responsive signal from the tag; and
   determine which of the first power level and the second power level is the lowest.

19. The system of claim 18, wherein the reader device is further operable to localize the tag based upon which of the first power level and the second power level is the lowest.

20. A non-transitory computer readable storage medium on which is embedded one or more computer programs, said one or more computer programs implementing a method for localizing a plurality of cables with a reader device having a plurality of loop antennas, wherein each of the plurality of loop antennas comprises an opening and is positioned to receive a cable end through the opening, said one or more computer programs comprising a set of instructions for:
   activating at least one of the plurality of antennas to transmit an RF signal at a first signal range directed toward one or more tags placed on one or more of the plurality of cables;
   determining whether a responsive signal is received from at least one of the one or more tags;
   altering the signal range of the antenna to a second signal range in response to a determination that a responsive signal has not been received from at least one of the one or more tags;
   determining whether a responsive signal is received from the at least one of the one or more tags; and
   in response to a determination that a responsive signal has been received from the tag, localizing the tag and the cable on which the tag has been placed based upon the signal range at which the responsive signal from the tag was received.

\* \* \* \* \*